United States Patent [19]

Yamamoto et al.

[11] 4,146,590
[45] Mar. 27, 1979

[54] PROCESS FOR THE PRODUCTION OF MODIFIED POLYOLEFIN

[75] Inventors: Noboru Yamamoto, Ohi; Makoto Yoda, Kawagoe; Shozo Wada, Zushi, all of Japan

[73] Assignee: Toa Nenryo Kogyo Kabushiki Kaisha, Tokyo, Japan

[21] Appl. No.: 582,651

[22] Filed: Jun. 2, 1975

[30] Foreign Application Priority Data

Jun. 19, 1974 [JP] Japan ................................. 49/69059

[51] Int. Cl.$^2$ .......................................... C08F 255/00
[52] U.S. Cl. ............................... 260/878 R; 528/271; 528/333
[58] Field of Search ..................... 260/878 R, 78.4 D; 528/271, 333

[56] References Cited

U.S. PATENT DOCUMENTS

| 2,993,880 | 7/1961 | Aldridge et al. | 260/78.4 D |
| 3,862,265 | 1/1975 | Steinkamp et al. | 260/878 R |
| 3,896,064 | 7/1975 | Koishi et al. | 260/78.4 D |

*Primary Examiner*—Alan Holler
*Attorney, Agent, or Firm*—W. T. Clarke; J. J. Mahon

[57] ABSTRACT

Modified polyolefin having high adhesion strength and less irritating odor during processing is obtained by reacting unsaturated carboxylic acid or its anhydride grafted polyolefin with a bifunctional compound having alcohol groups or amine groups. Preferable unsaturated carboxylic acids are maleic acid, and endobicyclo-[2,2,1]-5-heptene-2,3-dicarboxylic acid. Preferable bifunctional compounds are ethylene glycol, 1,4-butanediol, 1,6-hexanediol, glycerine, ethylene diamine, 1,3-diaminopropane m-phenylene diamine, etc.

10 Claims, No Drawings

PROCESS FOR THE PRODUCTION OF MODIFIED POLYOLEFIN

FIELD OF THE INVENTION

This invention relates to a process for the modification of polyolefins and more particularly to a process for the production of modified polyolefins by combining a polyolefin chemically with one or more alicyclic carboxylic acids having a cis form non-conjugated double bond, $\alpha,\beta$-unsaturated carboxylic acids and their anhydrides in the presence of a radical producing agent in an extruder, wherein during or after the abovedescribed addition reaction, the modified polyolefin under molten state is reacted with one or more compounds having a plurality of alcoholic hydroxyl groups or amino groups, such as polyhydric alcohols, polyamines or amino alcohols, thereby fixing the unreacted unsaturated carboxylic acids or anhydrides thereof remaining in the modified polyolefin into the polyolefin, whereby a modified polymer having a more excellent adhesiveness than polyolefins modified by the carboxylic acids and anhydrides thereof is obtained while the release of the unreacted unsaturated carboxylic acids or anhydrides thereof which cause irritating odors during the production, working or molding of the modified polyolefin is suppressed.

DESCRIPTION OF THE PRIOR ART

Polyolefins such as polyethylene, polypropylene and polybutene-1, having no polar groups in the high molecular chain, are non-polar and generally crystalline and have a number of advantages in practical use, but use of these resins is considerably restricted because of their poor adhesiveness to glass fibers, metals and polar polymers and poor printing or dyeing properties.

In order to overcome the above-mentioned disadvantages of polyolefins, it has hitherto been proposed to incorporate polar groups in a polyolefin by grafting a polar monomer, for example, maleic anhydride, endobicyclo [2,2,1]-5-heptene-2,3-dicarboxylic acid or its anhydride to polypropylene. The modification reaction of a polyolefin by such a polar monomer can be carried out by dissolving the polyolefin in a solvent at a high temperature and adding the polar monomer and a radical producing agent thereto, but this is not advantageous from a commercial point of view because a number of processing steps such as dissolving of polymer, reaction, reprecipitation, filtration and drying are needed. A preferred method consists in carrying out the modification reaction in an extruder. In this method, for example, a modified polyolefin is obtained by feeding a polyolefin powder or pellets with a polar monomer and suitable radical producing agent to an extruder and passing the resulting mixture through the extruder at a temperature higher than the melting point of the polyolefin. This is very useful from an economical or working point of view. However, it is unavoidable that the modified polyolefin obtained by the modification reaction in an extruder contains some of the unreacted polar monomer, a part of which leaves the vent hole of the extruder or the surface of the molten polymer extruded from the die during the modification reaction, or a part of which will come out during a secondary working of the modified polyolefin such as in blending with glass fiber at a high temperature or molding of the modified polyolefin at a high temperature, causing often an irritating odor.

In order to suppress the generation of this odor, the unreacted polar monomer is removed from the modified polyolefin, but to this end, it is necessary to dissolve the modified polyolefin in a solvent followed by reprecipitation or to extract with a solvent capable of dissolving the polar monomer only and not dissolving the modified polyolefin. Therefore, this method is not put to practical use on a commercial scale.

SUMMARY OF THE INVENTION

The above-mentioned disadvantages are overcome by the present invention which provides a process for the modification of polyolefins by combining or adding continuously to a polyolefin an alicyclic carboxylic acid having a cis form non-conjugated double bond in the ring, $\alpha,\beta$-unsaturated carboxylic acids, their anhydrides or mixtures thereof, in the presence of a radical producing agent in an extruder, wherein during or after the addition reaction, the modified polyolefin under molten state is reacted with at least one compound having at least two alcoholic hydroxyl groups or amino groups, such as polyhydric alcohols, polyamines or amino alcohols, in a proportion of two molar equivalents or less to all the carboxylic acid or anhydride thereof contained in the modified polyolefin, thereby fixing the unreacted carboxylic acid monomer remaining in the carboxylic acid-modified polyolefin as an ester or amide compound with the polyhydric alcohol, polyamide or amino alcohol. According to this process, the release of the unreacted carboxylic acid monomer causing an irritating odor is suppressed to a minimum when the modified polyolefin is heated and molten in the production, working or molding thereof.

DETAILED DESCRIPTION OF THE INVENTION

A first feature of the present invention is that a polyhydric alcohol or polyamine added to a carboxylic acid-modified polyolefin is reacted selectively with the unreacted carboxylic acid or anhydride monomer. That is to say, the unreacted carboxylic acid monomer remaining in the modified polyolefin is effectively fixed by the polyhydric alcohol, polyamine or amino alcohol when used in a small quantity, that is, two molar equivalents or less, preferably 1.2 molar equivalents or less with reference to all the carboxylic acid or anhydride thereof present in the modified polyolefin (the carboxylic acid or anhydride thereof combined chemically with the polyolefin and the unreacted carboxylic acid or its anhydride monomer). Consequently, there takes place no generation of an irritating odor due to release of the unreacted carboxylic acid monomer when the modified polyolefin is thereafter heated or molded.

A second feature of the invention is that the modified polyolefin of the invention in which the unreacted monomer is fixed by adding a small amount of polyhydric alcohol, polyamine or amino alcohol shows improved adhesiveness to metals or glass fibers when compared to a polyolefin which is similarly modified by the carboxylic acid or its anhydride but not treated in accordance with the invention. When such a polyhydric alcohol, polyvalent amine or amino alcohol is added in a proportion of 1.2 molar equivalents or less to all the carboxylic acid or its anhydride present in the modified polyolefin, the modified polyolefin exhibits a very excellent adhesiveness to metals or glass fibers. Moreover, excellent mechanical and thermal properties that polyolefins have intrinsically are not affected by the addition of the polyhydric alcohol, polyvalent amine or amino alcohol. The modified polyolefin to which a polyhydric alcohol, polyamine or amino alcohol is added according to the present invention has similar or more improved printing, coating and dyeing properties and adhesiveness to metallic plating coatings or metallic vapor deposition films as compared with a polyolefin which is similarly modified by the carboxylic acid or its anhydride but not treated with a polyhydric alcohol, polyamine or amino alcohol.

A third feature of the invention is that glass fiber-reinforced polyolefins of excellent workability as well as mechanical properties can be obtained by blending the modified polyolefins treated according to the invention with glass fibers. It is well known that glass fiber-reinforced polyolefins having excellent mechanical properties can be obtained by blending polyolefins modified by alicyclic carboxylic acids having a cis form nonconjugated double bond in the ring, $\alpha,\beta$-unsaturated carboxylic acids of their anhydrides with glass fibers. Since this method is ordinarily carried out using an extruder and, some unreacted carboxylic acid or anhydride thereof is necessarily contained in the modified polyolefin, generation of an irritating odor due to release of the unreacted carboxylic acid is unavoidable in the step of blending glass fiber or in the step of molding the glass fiber-reinforced polyolefin.

According to the process of the invention, however, the unreacted carboxylic acid or its anhydride is fixed in the modified polyolefin readily and selectively by addition of a small amount of polyhydric alcohol, polyamine or amino alcohol, so that generation of an irritating odor in the above-mentioned steps is markedly suppressed, and, furthermore, glass fiber-reinforced polyolefins having similar or superior mechanical properties can be obtained as compared with glass fiber-reinforced polyolefins which polyolefins are modified by unsaturated carboxylic acid or anhydrides thereof but not treated with polyhydric alcohols, polyamines or amino alcohols.

Examples of polyolefins useful in the invention are polyethylene, polypropylene, ethylene-propylene copolymers and poly-$\alpha$-olefins such as polybutene-1 or mixtures thereof.

Examples of alicyclic carboxylic acids having a cis form non-conjugated double bond or their anhydrides are preferably cis-4-cyclohexene-1,2-dicarboxylic acid, endobicyclo [2,2,1]-5-heptene-2,3-dicarboxylic acid and their anhydrides. Preferred examples of $\alpha,\beta$-unsaturated carboxylic acids or their anhydrides are maleic anhydride and acrylic acid. In addition, maleic acid, fumaric acid, itaconic acid, citraconic acid, methacrylic acid, crotonic acid, isocrotonic acid, itaconic anhydride or citraconic anhydride can also be used.

The modification of a polyolefin with an unsaturated carboxylic acid or its anhydride according to the present invention is carried out using an extruder. In general, the modification reaction is carried out by feeding a polyolefin powder or pellets and unsaturated carboxylic acid or its anhydride with or without a radical producing agent, after being mixed or individually, to an extruder and passing through the extruder at a temperature of at least the melting point of the polyolefin.

Addition of a polyfunctional organic compound such as polyhydric alcohol, polyvalent amine or amino alcohol according to the invention may be carried out independently after the above-mentioned modification reaction. For example, the modified polyolefin pellets obtained by the above-mentioned modification reaction are mixed with the polyfunctional organic compound and again passed through the extruder at a temperature of higher than the melting point of the polyolefin. A more preferred method for modifying a polyolefin with an unsaturated carboxylic acid or its anhydride in an extruder consists in introducing such a polyfunctional organic compound forcibly into the middle of the extruder barrel and carrying out the reaction from this point to the outlet of the extruder. According to this method, the unreacted carboxylic acid or anhydride thereof contained already in the modified polyolefin is fixed in the modified polyolefin by the polyfunctional organic compound before the modified polyolefin leaves the extruder, so generation of an irritating odor due to the unreacted polar monomer, which takes place often in the case of modifying a polyolefin by an unsaturated carboxylic acid or its anhydride, can effectively be suppressed.

The polyfunctional organic compounds of the invention include polyhydric alcohols, polyamines and amino alcohols. Examples of the polyhydric alcohols are preferably ethylene glycol, 1,4-butanediol, 1,6-hexanediol, propylene glycol, glycerin, pentaerythritol, polyethylene glycols having a molecular weight of 40,000 or less and polypropylene glycols having a molecular weight of 40,000 of less. Useful examples of the polyamines are ethylenediamine, trimethylenediamine, hexamethylenediamine, p-phenylenediamine, benzidine, diethylenetetramine, tetramethylenepentamine and polyethyleneimine having a molecular weight of 40,000 or less. Useful examples of the amino alcohols are compounds having at least one amino group and at least one alcoholic hydroxyl group such as ethanolamine and 3-amino-1-propanol. However, the polyhydric alcohols, polyamines and amino alcohols of the invention are not to be interpreted as being limited to these examples.

PREFERRED EMBODIMENTS

The quantity of polyhydric alcohol, polyamine or amino alcohol to be added to an unsaturated carboxylic acid or its anhydride-modified polyolefin according to the invention is 0.1 to 2.0 molar equivalents, preferably 0.2 to 1.2 molar equivalents relative to all the carboxylic acid or anhydride thereof contained in the modified polyolefin. Where the quantity of a polyhydric alcohol, polyamine or amino alcohol is more than 2 molar equivalents, the adhesiveness of the modified polyolefin is lowered and where less than 0.1 molar equivalent, the effect of fixing the unreacted carboxylic acid or anhydride thereof in the polyolefin and thus suppressing generation of a stimulative odor during heating is insufficient. In the case of a range of 0.2 to 1.2 molar equivalents, in particular, not only is an irritating odor during heating sufficiently suppressed, but also the adhesiveness to metals or glass is much improved as compared with the case of polyolefins modified only by unsaturated carboxylic acids or anhydrides. Therefore, this range is most preferable.

The following examples are given in order to illustrate the invention in great detail without limiting the same, in which parts are to be taken as those by weight.

EXAMPLE 1

Ninety parts of crystalline polypropylene pellets having a melt index of 1.2, 10 parts of crystalline polypropylene powder having a melt index of 5.0, 1 part of endo-bicyclo [2,2,1]-5-heptene-2,3-dicarboxylic anhydride and 0.5 part of di-tert-butyl peroxide were mixed and passed through an extruder which barrel temperature was adjusted to 190° C. (screw diameter: 40 mm, alcohol-modified polypropylene has an increased adhesiveness as compared with the modified polypropylene to which no polyhydric alcohol was added.

TABLE 1

| Run No. | Polyhydric Alcohol Kind | Polyhydric Alcohol Amount (wt. %) | Molar[1] Ratio | Endo-Bicyclo[2,2,1]-5-Heptene-2,3-Dicarboxylic Anhydride Unreacted Amount[2] (wt. %) | Esterification Efficiency (%) A[3] | Esterification Efficiency (%) B[4] | Peel Strength From Al Foil[5] (Kg/cm) | Irritating Odor During Heating, Melting & Molding |
|---|---|---|---|---|---|---|---|---|
| 1 | No | 0 | 0 | 0.53 | — | — | 1.7 | Occurred |
| 2 | Ethylene Glycol | 0.30 | 1.0 | 0.05 | 91 | 24 | 2.3 | Little |
| 3 | 1,4-Butanediol | 0.43 | 1.0 | 0.05 | 91 | 24 | 2.3 | " |
| 4 | 1,6-Hexanediol | 0.56 | 1.0 | 0.06 | 89 | 22 | 2.6 | " |
| 5 | Tetraethylene Glycol | 0.92 | 1.0 | 0.11 | 79 | 20 | 2.8 | " |
| 6 | Glycerine | 0.44 | 1.0 | 0.01 | 98 | 25 | 2.9 | No |
| 7 | Pentaerythritol | 0.64 | 1.0 | 0.01 | 98 | 26 | 3.1 | No |

Note
[1] Molar ratio of polyhydric alcohol added to all carboxylic acid anhydride in modified polypropylene
[2] Endo-bicyclo[2,2,1]-5-heptene-2,3-dicarboxylic anhydride remaining in modified polypropylene, which is not reacted with polypropylene nor with polyhydric alcohol
[3] Esterification efficiency of unreacted endo-bicyclo[2,2,1]-5-heptene-2,3-dicarboxylic anhydride which is not combined with polypropylene
[4] Esterification efficiency of endo-bicyclo[2,2,1]-5-heptene-2,3-dicarboxylic anhydride which is combined with polypropylene
[5] Measured by holding a modified polypropylene film of 0.1 mm in thickness as a specimen between two sheets of aluminum foils of 0.1 mm in thickness, pressing at 200° C and 10 kg/cm$^2$ by means of a hot press for 2 minutes, cutting the resulting sample in a width of 2 cm and then subjecting to an Instron Tension Universal Tester at a tension rate of 5 cm/min L/D = 25, screw revolution number: 60 rpm) to obtain modified polypropylene pellets. In the thus obtained modified polypropylene pellets, 0.20% by weight of endo-bicyclo [2,2,1]-5-heptene-2,3-dicarboxylic anhydride was added and chemically combined, but 0.53% by weight of the carboxylic acid anhydride was left as unreacted in the modified polypropylene. The other carboxylic acid anhydride left a vent hole near the end of the extruder and was recovered by a cooler. When this modified polypropylene was heated, molten and molded, a marked irritating odor of endo-bicyclo [2,2,1]-5-heptene-2,3-dicarboxylic anhydride was produced.

The above-mentioned modified polypropylene pellets were blended with ethylene glycol, 1,4-butanediol, 1,6-hexanediol, tetraethylene glycol, glycerine and pentaerythritol respectively in equimolar quantities to all the endo-bicyclo [2,2,1]-5-heptene-2,3-dicarboxylic anhydride contained in samples of the modified polypropylene and separately passed through an extruder adjusted to 200° C. to effect the esterification reaction, thus obtaining six kinds of modified polypropylenes (referred to as "polyhydric alcohol-modified polypropylene"). In Table 1 are shown the quantity of unreacted carboxylic acid anhydride remaining in the polyhydric alcohol-modified polypropylene, esterification efficiency and peel strength from an aluminum foil (thickness: 0.1 mm). As is apparent from Table 1, the polyhydric alcohol selectively esterifies the unreacted endo-bicyclo [2,2,1]-5-heptene-2,3-dicarboxylic anhydride and fixes in the modified polypropylene to thus prevent generation of an irritating odor during heating, melting and molding. Furthermore, the polyhydric

EXAMPLE 2

90 parts of crystalline polypropylene pellets having a melt index of 1.2, 10 parts of crystalline polypropylene powder having a melt index of 5.0, 1.0 part of endo-bicyclo [2,2,1]-5-heptene-2,3-dicarboxylic anhydride and 0.4 part of 2,5-dimethyl-2,5-di-tert-butylperoxyhexyne-3 were mixed, fed from a hopper to an extruder having a screw diameter of 50 mm, L/D of 32, liquid inlet under pressure at the position of L/D 16 from the feed inlet and vent hole at the position of L/D 24, which barrel temperature was adjusted to 190°-200° C. and the extruder reaction was carried out at a screw revolution number of 110 rpm, while glycerine, polyethylene glycol (molecular weight: 400) or ethylene glycol in a quantity of 0.75 molar equivalent to the carboxylic acid anhydride was introduced forcibly from the above-described liquid inlet under pressure and the esterification reaction was carried out in the latter half of the extruder. The molten strands of the modified polypropylene were discharged from a die of the extruder, cooled by water and then pelletized.

In another run modified polypropylene obtained in an analogous manner except not adding the polyhydric alcohol, 0.30% by weight of endo-bicyclo [2,2,1]-5-heptene-2,3-dicarboxylic anhydride was chemically combined and 0.57% by weight of the unreacted carboxylic acid anhydride was contained. The other carboxylic acid anhydride was discharged from the vent hole, cooled and recovered. In this latter case, a marked irritating odor was generated when the modified polypropylene was extruded from the die.

The results are tabulated below:

TABLE 2

| Run No. | Polyhydric Alcohol Kind | Amount (wt. %) | Molar[1] Ratio | Endo-Bicyclo[2,2,1]-5-Heptene-2,3-Dicarboxylic Anhydride Unreacted Amount[2] (wt. %) | Esterification Efficiency (%) A[3] | Esterification Efficiency (%) B[4] | Peel Strength From Al Foil[5] (Kg/cm) | Irritating Odor During Heating, Melting & Molding |
|---|---|---|---|---|---|---|---|---|
| 8 | No | 0 | 0 | 0.57 | — | — | 1.7 | Occurred |
| 9 | Glycerine | 0.42 | 0.75 | 0.02 | 97 | 21 | 3.2 | No |
| 10 | Polyethylene Glycol | 1.83 | 0.75 | 0.13 | 77 | 17 | 4.3 | Little |
| 11 | Ethylene Glycol | 0.28 | 0.75 | 0.07 | 88 | 19 | 2.5 | " |

Note: 1), 2), 3), 4) and 5) — same as those of Table 1

EXAMPLE 3

40 parts of crystalline polypropylene pellets having a melt index of 15 and 20 parts of glass fiber chopped strands (400 glass fibers of 13 microns in diameter, bundled and cut in a length of 6 mm) surface-treated with γ-aminopropyltriethoxy-silane were blended with 40 parts of pellets of the polyhydric alcohol-free modified polypropylene (Run No. 1), the ethylene glycol-added modified polypropylene (Run No. 2), the glycerine-added modified polypropylene (Run No. 6) or the pentaerythritol-added modified polypropylene by means of a tumbler mixer and then passed through an extruder adjusted to 230° C. (screw diameter: 40 mm, L/D = 25, screw rpm = 49) to obtain glass fiber-added modified polypropylene pellets in each case. In the case of the polyhydric alcohol-free modified polypropylene, a marked irritating odor was generated from the molten resin strands extruded from the extruder die, while there was hardly any odor generated in the case of the polyhydric alcohol-added modified polypropylenes.

Then test pieces were prepared from the resulting glass fiber-added modified polypropylene pellets by injection molding. During the same time also, an irritating odor was generated in the case of the polyhydric alcohol-free modified polypropylene, but there was no irritating odor in the case of the polyhydric alcohol-added modified polypropylenes. The physical properties of each of the resulting test pieces were measured to obtain results as shown in Table 3. It is apparent from these results that the modified polypropylenes treated with the polyhydric alcohols give improved mechanical properties.

TABLE 3

| Run No. | 12 | 13 | 14 | 15 |
|---|---|---|---|---|
| Polyhydric Alcohol Treatment | No | Ethylene Glycol | Glycerine | Pentaerythritol |
| Mechanical Properties (23° C) | | | | |
| Tensile Strength (Kg/cm²) (ASTM D-638) | 850 | 860 | 880 | 910 |
| Bending Strength (Kg/cm²) (ASTM D-790) | 1140 | 1160 | 1160 | 1170 |
| Bending Modulus (Kg/cm²) (ASTM D-790) | 35100 | 35700 | 35700 | 35400 |
| Izod Impact Strength (Kg . cm/cm²) notched (ASTM D-256) | 10 | 10 | 10 | 11 |
| Irritating Odor During Blending with Glass Fiber and Injection Molding | Occurred | No | No | No |

EXAMPLE 4

The procedure of Example 2 was repeated except using 1 parts of maleic anhydride in place of endo-bicyclo [2,2,1]-5-heptene-2,3-dicarboxylic anhydride and using, as a polyhydric alcohol, glycerine in a quantity of 0.50 molar equivalent to the maleic anhydride used, thus obtaining modified polypropylene pellets (Run No. 16). For comparison, a glycerine-free experiment was carried out (Run No. 17). In each case, a film was prepared from the resulting pellets by means of a chilled roll film making apparatus. An irritating odor of unreacted maleic anhydride was generated during preparing the modified polypropylene and during preparing the film in the case of the glycerine-free modified polypropylene, whilst there was no irritating odor in the case of the glycerine-added modified polypropylene. The peel strength for aluminum, measured in an analogous manner to Example 1, was 1.5 Kg/cm in the case of adding no glycerine and 2.8 Kg/cm in the case of adding glycerine.

EXAMPLE 5

The procedure of Example 4 was repeated except using 2 parts of cis-4-cyclohexene-1,2-dicarboxylic anhydride in place of maleic anhydride and using, as a polyhydric alcohol, 1,6-hexanediol in a quantity of 0.50 molar equivalent to the cis-4-cyclohexene-1,2-dicarboxylic anhydride used, thus obtaining modified polypropylene pellets. An irritating odor was generated during preparing the modified polypropylene and during preparing the film in the case in which no 1,6-hexanediol was added (Run No. 18), while there was no irritating odor in the case when 1,6-hexanediol was added (Run No. 19). The peel strength for aluminum was 0.8 Kg/cm in the case when no 1,6-hexanediol was added and 1.3 Kg/cm in the case of adding 1.6-hexanediol.

EXAMPLE 6

100 parts of high pressure process polyethylene pellets having a melt index of 7.0 and density of 0.925, 1 part of endo-bicyclo [2,2,1]-5-heptene-2,3-dicarboxylic anhydride and 0.3 part of bis(tert-butylperoxyisopropyl) benzene were mixed and passed through the extruder used in Example 1, which barrel temperature was adjusted to 190° C., thus obtaining modified polyethylene pellets. In the thus obtained modified polyethylene pellets, 0.30% by weight of endo-bicyclo [2,2,1]-5-heptene-2,3-dicarboxylic anhydride was chemically combined and 0.52% by weight of the unreacted dicarboxylic anhydride was contained. When this modified polyethylene was subjected to melting and molding to give a film, for example, an irritating odor due to the unreacted dicarboxylic anhydride was produced. The adhesive strength to aluminum was 2.0 Kg/cm (Run No. 20).

To this modified polyethylene was added 1.5% by weight of polyethylene glycol (Molecular weight: 400), i.e., corresponding to 0.75 molar equivalent to all the carboxylic acid anhydride contained in the modified polyethylene and the mixture was passed through the above-described extruder (200° C.) to effect the esterification reaction. Consequently, 81% of the unreacted carboxylic acid was esterified to reduce the quantity of the unreacted carboxylic acid to 0.1% by weight and hardly any irritating odor was generated during molding. The adhesive strength to aluminum was 2.8 Kg/cm (Run No. 21).

alcohol-modified ethylene-propylene copolymer, esterification efficiency and peel strength from an aluminum foil. As is evident from these results, the unreacted carboxylic anhydride is selectively esterified and fixed in the modified polymer by the polyhydric alcohol and an irritating odor during molding is thus remarkably reduced. Furthermore, the adhesiveness to aluminum foil is more raised.

TABLE 4

| Run No. | Polyhydric Alcohol Kind | Amount (wt. %) | Molar[1] Ratio | Endo-Bicyclo [2,2,1]-5-Heptene-2,3-Dicarboxylic Anhydride Unreacted Amount[2] (wt. %) | Esterification Efficiency (%) A[3] | B[4] | Peel Strength From Al Foil[5] (kg/cm) | Irritating Odor During Heating, Melting & Molding |
|---|---|---|---|---|---|---|---|---|
| 22 | No | 0 | 0 | 1.02 | — | — | 2.2 | Occurred |
| 23 | 1,4-Butanediol | 0.33 | 0.40 | 0.08 | 92 | 23 | 4.3 | Little |
| 24 | Glycerine | 0.34 | 0.40 | 0.02 | 98 | 25 | 3.9 | No |
| 25 | Pentaerythritol | 0.50 | 0.40 | 0.02 | 98 | 25 | 3.0 | No |

Note: 1), 2), 3), 4) and 5) — same as those of Table 1.

EXAMPLE 7

100 parts of crystalline ethylene-propylene copolymer having an ethylene content of 7.2% by weight and a melt index of 1.0, 2 parts of endo-bicyclo [2,2,1]-5-heptene-2,3-dicarboxylic anhydride and 0.5 part of di-tert-butyl peroxide were mixed and passed through the extruder used in Example 1, which barrel temperature was adjusted to 190° C., thus obtaining modified ethylene-propylene copolymer pellets.

In the thus obtained modified copolymer pellets, 0.50% by weight of endo-bicyclo [2,2,1]-5-heptene-2,3-dicarboxylic acid anhydride was chemically combined and 1.02% by weight of the dicarboxylic acid anhydride was left as unreacted in the modified copolymer. When this modified ethylene-propylene copolymer was heated, molten and molded, the unreacted endo-bicyclo [2,2,1]-5-heptene-2,3-dicarboxylic anhydride was released to give a marked irritating odor.

To these modified ethylene-propylene copolymer pellets was added 1,4-butanediol, glycerine or pentaerythritol in a quantity of 0.4 molar equivalent to all the endo-bicyclo [2,2,1]-5-heptene-2,3-dicarboxylic anhydride contained therein and the resulting mixture was passed through the extruder adjusted to 190° C. to effect the esterification reaction, thus obtaining the polyhydric alcohol-modified ethylene-propylene copolymer pellets.

In Table 4 are shown the quantity of the unreacted carboxylic acid anhydride remaining in the polyhydric

EXAMPLE 8

To the endo-bicyclo [2,2,1]-5-heptene-2,3-dicarboxylic anhydride-modified polypropylene pellets obtained in Run No. 1 of Example 1 was added ethylenediamine in a quantity of 1.0 molar equivalent to all the endo-bicyclo [2,2,1]-5-heptene-2,3-dicarboxylic anhydride (0.73% by weight) contained in this modified polymer, molten and blended by means of a Brabender Plastgraph adjusted to 190° C. for 5 minutes, thus obtaining a modified polypropylene. In an analogous manner, modified polymers (referred to as "polyamine-modified polypropylene") were obtained using 1,3-diaminopropane, m-phenylenediamine, p-phenylenediamine and benzidine.

In Table 5 are shown the quantity of the unreacted dicarboxylic anhydride remaining in such polyamine-modified polypropylenes, amide-forming efficiency and peel strength from an aluminum foil. As is evident from this table, the unreacted dicarboxylic anhydride is selectively converted into the corresponding amide by the polyamine and fixed in the modified polypropylene, and, consequently, hardly any irritating odor is generated during heating and melting. Furthermore, the peel strength from an aluminum foil is increased.

TABLE 5

| Run No. | Polyamine Kind | Amount (wt. %) | Molar[1] Ratio | Endo-Bicyclo [2,2,1]-5-Heptene-2,3-Dicarboxylic Anhydride Unreacted Amount[2] (wt. %) | Amide-Forming Efficiency (%) A[3] | B[4] | Peel Strength From Al Foil[5] (kg/cm) | Irritating Odor During Heating, Melting & Molding |
|---|---|---|---|---|---|---|---|---|
| 1 | No | 0 | 0 | 0.53 | — | — | 1.7 | Occurred |
| 26 | Ethylenediamine | 0.27 | 1.0 | 0.02 | 96 | 38 | 2.1 | No |
| 27 | 1,3-Diaminopropane | 0.34 | 1.0 | 0.01 | 98 | 42 | 1.8 | " |
| 28 | m-Phenylenediamine | 0.49 | 1.0 | 0.02 | 96 | 40 | 3.0 | " |
| 29 | p-Phenylenediamine | 0.49 | 1.0 | 0.02 | 96 | 37 | 3.4 | " |
| 30 | Benzidine | 0.84 | 1.0 | 0.05 | 91 | 33 | 4.4 | " |

Note
[1] Molar ratio of polyamine added to all carboxylic anhydride in modified polypropylene
[2] Dicarboxylic anhydride remaining in modified polypropylene, which is not reacted with polypropylene nor with polyamine
[3] Amide-forming efficiency of unreacted dicarboxylic anhydride, which is not combined with polypropylene
[4] Amide-forming efficiency of dicarboxylic anhydride, which is combined with polypropylene
[5] Same as in Table 1

EXAMPLE 9

To the endo-bicyclo [2,2,1]-5-heptene-2,3-dicarboxylic anhydride-modified ethylene-propylene copolymer pellets obtained in Example 7 was added monoethanolamine or 3-amino-1-propanol in a molar proportion of 1.0 to all the endo-bicyclo [2,2,1]-5-heptene-2,3-dicarboxylic anhydride contained in this modified polymer, and the mixture was then molten and blended for 5 minutes by means of a Brabender Plastgraph adjusted to 190° C. to obtain a modified polymer. As shown in Table 6, hardly any irritating odor was generated during heating and molding as in the case of using polyhydric alcohols and polyamines and the peel strength for an aluminum foil was markedly increased.

TABLE 6

| Run No. | Amino Alcohol Kind | Amount (wt. %) | Molar Ratio | Endo-Bicyclo [2,2,1]-5-Heptene-2,3-Dicarboxylic Anhydride Unreacted Amount (wt. %) | Reaction Efficiency (%) A | Reaction Efficiency (%) B | Peel Strength From Al Foil (Kg/cm) | Irritating Odor During Heating, Melting & Molding |
|---|---|---|---|---|---|---|---|---|
| 22 | No | 0 | 0 | 1.02 | — | — | 2.2 | Occurred |
| 31 | Monoethanolamine | 0.58 | 1.0 | 0.04 | 96 | 31 | 3.5 | No |
| 32 | 3-Amino-1-Propanol | 0.71 | 1.0 | 0.04 | 96 | 29 | 2.9 | No |

What is claimed is:

1. In a process for the production of modified polyolefins by combining, in an addition reaction, a polyolefin with one or more alicyclic carboxylic acids having a cis form non-conjugated double bond, alpha beta unsaturated carboxylic acids or their anhydrides in the presence of a radical producing agent in an extruder, the improvement which comprises reacting the modified polyolefin reaction mixture, said reaction mixture containing said carboxylic acids or anhydrides in unreacted form, in the molten state with 0.1 to 1.2 molar equivalents of at least one polyfunctional compound selected from the group consisting of polyhydric alcohols, polyamines and amino alcohols, said polyfunctional compound reacting substantially selectively with said unreacted carboxylic acid and anhydrides, whereby 77–98% of the unreacted unsaturated carboxylic acids or anhydrides remaining in the modified polyolefin are fixed into the polyolefin.

2. The process according to claim 1 wherein the modified polyolefin is reacted with the polyfunctional compound during the addition reaction.

3. The process according to claim 1 wherein the modified polyolefin is reacted with the polyfunctional compound after the addition reaction.

4. The process according to claim 1 wherein the polyfunctional compound is a polyhydric alcohol.

5. The process according to claim 4 wherein the polyhydric alcohol is selected from the group consisting of ethylene glycol, 1,4-butane diol, 1,6-hexane diol, propylene glycol, glycerin, pentaerythritol, polyethylene glycols having a molecular weight not more than 40,000 and polypropylene glycols having a molecular weight of not more than 40,000.

6. The process according to claim 1 wherein the polyfunctional organic compound is a polyamine.

7. The process according to claim 6 wherein the polyamine is selected from the group consisting of ethylene diamine, trimethylene diamine, hexamethylene diamine, paraphenolamine diamine, benzidine, diethylene tetra amine, tetramethylene pentamine and polyethylene imine having a molecular weight of not more than 40,000.

8. The process according to claim 1 wherein the polyfunctional organic compound is an amino alcohol having at least one amino group and at least one alcoholic hydroxyl group.

9. The process according to claim 8 wherein the amino alcohol is selected from the group consisting of ethanol amine and 3-amino-1-propanol.

10. The product of the process of claim 1.

* * * * *